June 22, 1937.  J. N. GARRISON  2,084,768
FRACTIONATING TOWER
Filed Dec. 1, 1932
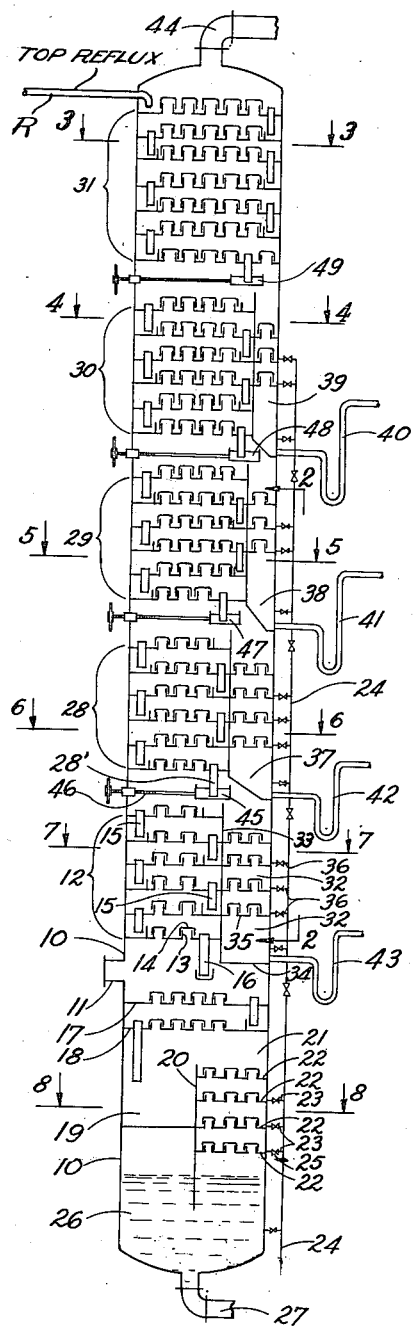
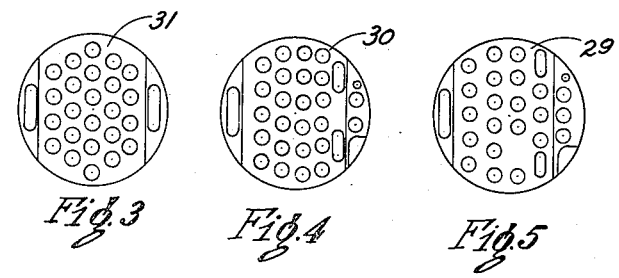
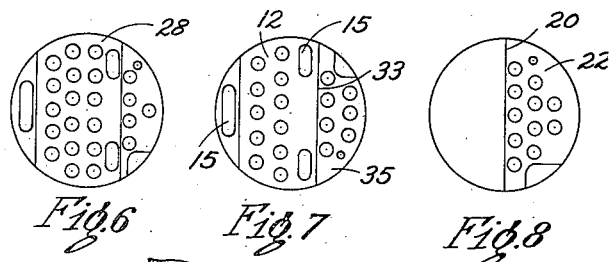
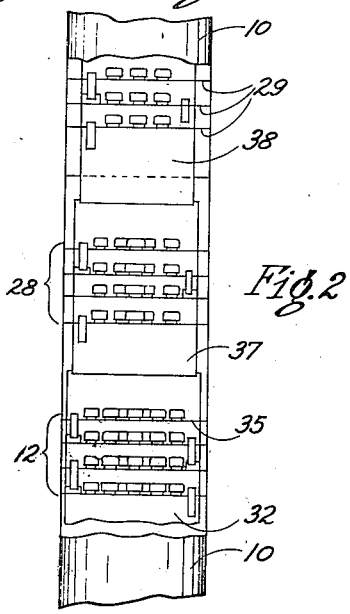
Inventor
JAMES N. GARRISON
By Richey & Watts
Attorneys Patented June 22, 1937

2,084,768

UNITED STATES PATENT OFFICE 2,084,768

FRACTIONATING TOWER

James N. Garrison, Cleveland, Ohio

Application December 1, 1932, Serial No. 645,226

12 Claims. (Cl. 196—139)

This invention relates to fractional distillation and more particularly to an improved method of an apparatus for fractionally distilling composite liquids such as hydro-carbon oils.

The fractional distillation process is widely used in the separating of crude oil into its various commercial constituents such as gasoline, lubricating oil, asphalt, etc. In the fractional distillation process as it has been carried out prior to my invention it has been proposed to strip the low boiling point constituents from the side streams or fractions which are taken off the various points in the usual fractionating column. This stripping is accomplished by passing steam in counter-current flow to the liquid removed from the column and one method and apparatus for carrying out this process is disclosed in United States Letters Patent to Joseph W. Lewis, Jr. No. 1,680,421, of August 14, 1928.

The present invention relates to an improved form of fractionating column or tower in which both the fractional condensation and the stripping steps of the fractional distillation process are carried out. Other objects of my invention are: the provision of a fractionating column in which one or more of the side streams may be rectified and in which the available space is utilized with the greatest efficiency; the provision of apparatus for fractionally distilling, and then rectifying the side streams resulting from the fractional distillation, which occupies a minimum space for its capacity and which may be economically constructed and operated; the provision of a fractionating column in which the vapor velocity through the column is maintained substantially constant; the provision of a fractionating column and means for rectifying the side streams from the fractionating column in which the maximum rectifying action will be carried out on the side stream fraction at the bottom of the column and the side streams of successively lower boiling points will be subjected to successively less rectifying action; the provision of apparatus for fractionating and rectifying the side streams resulting from the fractionation which may be constructed, erected and operated with a minimum of expense.

A common type of apparatus for accomplishing the fractional distillation of petroleum oils consists of a relatively long cylindrical tower or column having a plurality of bubble trays extending transversely across the column. These bubble trays are provided with a plurality of bubble caps. Heated oil and vapor is discharged into the lower portion of the column and the vapors pass upwardly through the bubble trays. As they pass upwardly they condense in the liquid on the trays and a certain portion of the liquid so condensed is permitted to pass down through the column from one tray to another. At intervals on the side of the column take-off pipes are provided which are adapted to conduct away side streams of condensed liquid. The position of these take-off pipes on the column determines the type of liquid which will be removed thereby and, as is well understood in the art, the arrangement provides means for separating a complex oil into its various constituents.

It will also be understood by those skilled in the art of petroleum fractionation that the vapor volume near the base of the fractionating column, or that portion of the column into which the petroleum is discharged after having previously been heated in some suitable apparatus outside of the tower, is minimum. The vapor volume near the top of the column, on the other hand, is at its maximum value (this being the case where top reflux, entering the column through pipe R of Figure 1 and either hot or cold, is maintained). The column must be designed to handle the maximum vapor volume which occurs near the top and therefore the effective cross sectional area of the column at the top must be sufficient to pass the top volume of vapors at the desired, most efficient rate of flow. I therefore have designed my improved fractionating tower in cylindrical form of a diameter sufficient to pass the top vapor volume at the desired velocity. The inside of my tower is so arranged that the cross sectional area of the vapor path through the fractionating section of the tower gradually diminishes from the top downwardly toward the bottom thereof and the vapor path therefore is of gradually increasing cross sectional area from the bottom to the top thereof and is preferably designed to maintain a substantially constant vapor velocity through the tower.

By providing a number of rectifying sections within the tower, the rectifying sections being of successively decreasing cross sectional areas from the bottom to the top of the tower, I utilize to the fullest extent the entire interior of the cylindrical shell. Moreover, as the largest rectifying section occurs at the bottom of the tower, which is the point at which the greatest rectifying action is desirable, my apparatus provides a most efficient means for fractionating petroleum oils into components which are discharged from the column in finished condition.

The accompanying drawing diagrammatically illustrates a preferred form of my improved fractionating column and side stream rectifier. In the drawing—

Figure 1 is a vertical section through a fractionating tower embodying my invention.

Figure 2 is a side elevation of the central portion of the tower shown in Figure 1 with a portion of the outside wall between lines 2—2 of Figure 1, broken away to show the arrangement of the rectifying sections.

Figure 3 is a cross section taken on line 3—3 of Figure 1.

Figure 4 is a cross section taken on line 4—4 of Figure 1.

Figure 5 is a cross section taken on line 5—5 of Figure 1.

Figure 6 is a cross section taken on line 6—6 of Figure 1.

Figure 7 is a cross section taken on line 7—7 of Figure 1.

Figure 8 is a cross section taken on line 8—8 of Figure 1.

In the particular form of apparatus illustrated the outer shell 10 is provided with a hot oil or vapor inlet 11 through which oil from a still or heater is discharged into the interior of the column. Immediately above the inlet 11 is a group of superimposed bubble trays 12 which are provided with vapor up-takes 13 and bubble caps 14 of well known form. As the vapor which is discharged into the column passes upwardly it must necessarily bubble through the reflux liquid which is on the trays 12 and certain portions of the vapors will be condensed therein. Down flow pipes 15 are adapted to maintain the proper liquid level on the fractionating trays 12 and also convey the reflux liquid downwardly through the tower from one fractionating tray to another. The liquid on the lowermost fractionating tray 12 passes down through the pipe 16 onto the tray 17 from which it overflows to another bubble tray 18. The chamber 19 is substantially semi-circular in cross section (see Fig. 8) and is adapted to receive the overflow liquid from the tray 18. The wall 20 separates the liquid collecting chamber 19 from the lower and largest stripping section, generally indicated at 21. After the liquid rises in the chamber 19 to the top of the wall 20 it overflows onto the bubble trays 22 of the stripping section 21. Steam, preferably superheated to the proper temperature to strip the liquid of its lower boiling point constituents, is supplied to the bubble trays 22 through the branch pipes 23 which lead off of the main steam supply pipe 24. The flow of steam to the stripping section 21 may be controlled by suitable valves 25 in the pipe 23.

Thus, as the liquid passes down over the superimposed bubble trays 22 it is subjected to heating and rectifying action of the superheated steam which strips or removes the undesired low boiling point components from the liquid and carries them on up through the tower with the rest of the vapors. The liquid which has thus been treated in the stripping section 21 collects in the bottom portion 26 of the column and may be withdrawn through the residuum outlet 27.

Above the series of bubble trays indicated by the reference numeral 12 is another series of bubble trays indicated by reference numeral 28.

A comparison of Figures 6 and 7 will show that the fractionating bubble trays 28 are of somewhat larger area than the fractionating bubble trays 12 and are provided with more bubble caps. Consequently the trays 28 offer less resistance to flow of gas than the trays 12 and the vapor velocity will not be reduced although the vapor volume is increased. The arrangement of the trays 28 is substantially the same as that of trays 12 and other similar sets of bubble trays 29, 30, and 31 are disposed above the trays 28. Reflux liquid from any suitable source is directed into the top of the tower through the pipe R in well known manner. Reference to Figures 5, 4, and 3 will show that the area of the trays 29, 30, and 31 increases with each group and also that the number of bubble caps increases. The group of fractionating trays 31 extend across the entire cross section of the tower and contain the proper number of bubble caps to provide the particular vapor velocity which will result in the most effective operation of the column.

As the vapor volume decreases from the top to the bottom of the tower it will be seen that by properly reducing the areas of the successive groups of fractionating bubble trays 31, 30, 29, 28, and 12 the velocity of flow of vapor through the tower may be maintained substantially constant.

A rectifying section 32 is located adjacent the trays 12 and is separated from the main vapor passage of the tower by the dividing wall 33 and the bottom wall 34. In this rectifying section 32 are bubble trays 35, generally similar to bubble trays 22 of stripping section 21, but provided with a smaller number of bubble caps. Rectifying steam is supplied to section 32 through the pipes 36.

Similar rectifying sections, similarily connected to the main steam supply pipe 24, are indicated at 37, 38, and 39. These rectifying sections are disposed successively above the rectifying section 32 and the bubble trays of each section are of less area and have a smaller number of bubble caps than the trays of the rectifying section immediately below. A trapped pipe 40 leads from the bottom of rectifying section 39 and is adapted to conduct the side stream therein removed to a cooler and thence to a suitable tank or other place of disposal.

Similar trapped pipes 41, 42, and 43 are adapted to conduct away the condensed fractions of successively increasing boiling points from the rectifying sections 38, 37, and 32, respectively. At the top of the tower a vapor outlet 44 is provided and is adapted to conduct the top vapors to a suitable condenser.

To handle the liquid from the bottom fractionating tray 28 an adjustable seal 45 is placed under the downpour pipe 28' of the bottom fractionating tray 28 in such manner that a predetermined quantity of the descending reflux can be diverted into the rectifying section 32 as a product. An adjusting screw 46 controls the position of the seal 45 relative to the dividing wall 33 and thus controls the amount of product liquid which is then taken from the main fractionating trays 28 and discharged into the rectifying section 32 in which the undesired relatively low boiling point components are removed. Similar adjustable seals 47, 48, and 49, each having a similar adjusting screw are adapted to conduct the respective products from the groups of fractionating trays 29, 30, and 31 respectively to the rectifying sections 37, 38, and 39 respectively.

From the above it will be seen that a portion of the fractions which are condensed in the reflux liquid and collected on the bubble trays 31 of the top fractionating section will be directed into the rectifying section 39 in which certain lower boiling point components will be removed and from which the finished product will be delivered through the pipe 40. In like manner a portion of the fraction that is condensed and collected on the bubble trays 30 will pass from the adjustable seal 48 to the rectifying section 38 and thence out through the pipe 41 and the fraction collected on trays 28 will be subjected to the rectifying action of the steam in section 32. The residuum products which pass from the trays 12 into the lower portion of the column are stripped n section 21.

As the side stream fractions which are taken off of the column near the bottom will contain a maximum quantity of light ends below some predetermined fixed boiling point it will be seen that the larger rectifying sections in the lower portion of the column will have sufficient capacity to properly remove the relatively large amount of such light ends. As we approach the upper part of the column the amount of light ends in the products condensed on the bubble trays becomes reduced and therefore the smaller rectifying sections are ample to properly rectify the side stream fractions before they are discharged from the tower.

From the above description it will be seen that by combining the superimposed groups of fractionating bubble trays and the rectifying sections in a single cylindrical tower I am able to utilize space within the tower to the very best advantage and also secure the best operating results due to the maintenance of the uniform velocity of vapor flow through the bubble trays. In addition the heat losses are reduced to a minimum and the construction costs and space requirements are much less than with previous types of fractionating bubble trays and rectifying or exhausting columns with which I am familiar.

As the products which are withdrawn from the various groups of bubble trays through the seals 45, 47, 48, and 49 are also subjected to the heat of the surrounding vapors while they are in the respective rectifying sections of the apparatus this heat is available to assist the steam in removing the low boiling point components. It will also be noted that the rectifying section 32, which is immediately above the inlet 11 for the hot oil and vapors, will be subjected to the greatest vapor heat and that the vapor heat which is effective upon the rectifying sections 37, 38, and 39 is successively less than that effective upon section 32. This is in accordance with the desired heat application as the fraction which is rectified in the section 32 contains a greater quantity of light ends than the fractions in the above rectifying sections and therefore requires a greater amount of heat to properly strip it of its low boiling point constituents.

In my improved apparatus it will be noted that a continuous fractionating zone is provided and that the materials being treated are not withdrawn from the tower until they are finished products. This results in a great saving of heat as compared with prior processes in which a portion of the reflux material has been removed from the tower to some external point and rectified. By providing a continuous fractionating zone, the several fractionating sections of which are contiguous, the necessity for external conductor pipes for conveying the reflux oil from one fractionating section to another is eliminated. My tower utilizes the space available to the fullest extent, minimizes heat loss, and results in more efficient operation than can be obtained with previously proposed structures with which I am familiar.

Although I have described in considerable detail the diagrammatically illustrated embodiment of my invention, it will be seen by those skilled in the art that variations and modifications may be made without departing from the spirit of my invention. I do not, therefore, limit myself to the specific arrangement of apparatus and steps of my method herein shown and described but claim as my invention all embodiments thereof coming within the scope of the appended claims.

I claim:

1. In apparatus of the class described a fractionating tower of substantially cylindrical form, a series of rectifying sections having walls defining a vapor path through the tower and being disposed in superimposed relation in said tower and with the section of greatest cross sectional area at the lower part of the tower, the sections above being of successively smaller cross sectional area, whereby the vapor path through the tower is of increasing cross sectional area from the lower portion to the upper portion of the tower, a plurality of bubble trays extending across said vapor path through the tower and means for conveying liquid from said bubble trays to said rectifying sections.

2. In oil fractionating apparatus, a shell, means within said shell for defining an upwardly flaring vapor path therethrough, means for discharging heated oil and vapor into the lower small end of said flaring path, a plurality of bubble trays extending across said path, a plurality of rectifying sections disposed in superimposed relation along said path, said rectifying sections being of successively increasing cross-sectional area and disposed with the section of largest area adjacent the small end of said flaring vapor path and means for conveying liquid from said bubble trays to said rectifying sections.

3. In oil treating apparatus of the class described, a tower of substantially uniform cross sectional area throughout its height, a plurality of rectifying sections within said tower, said rectifying sections being of successively decreasing area from the lowermost section to the top section whereby a vapor path of upwardly flaring form is defined within said tower, a plurality of bubble trays arranged to form superimposed fractionating zones and extending across said vapor path, means for conveying product liquid from the bottom bubble tray of each fractionating zone to the rectifying section next below and means for injecting steam into said rectifying sections.

4. Apparatus for fractionating oil and rectifying the separated products including a shell having an inlet for oil and vapor, a plurality of rectifying sections within said shell having walls arranged to provide a vapor path of flaring form extending from said inlet lengthwise of said shell, a plurality of fractionating sections in said vapor path and means for conducting oil from said fractionating sections to said rectifying sections, said rectifying sections being of successively decreasing cross sectional area from said inlet along said vapor path and being defined by walls which form at least a portion of the walls which define said vapor path whereby the hot vapors passing through the vapor path may heat the oil in the rectifying sections and assist in stripping off the low boiling point constituents.

5. In apparatus of the type described, a tower, a plurality of rectifying sections within said tower, said rectifying sections being of successively decreasing cross-sectional area from the lowermost section to the top section whereby a vapor path of upwardly flaring form is defined within said tower, a plurality of bubble trays extending across said vapor path and arranged to form a plurality of fractionating sections, means for conveying product liquid from the bottom bubble trays of the fractionating sections to said rectifying sections, and means for varying the quantity of product liquid delivered to said rectifying sections.

6. In apparatus of the type described, a tower, a plurality of rectifying sections within said tower, said rectifying sections being of successively decreasing cross sectional area from the lowermost section to the top section whereby a vapor path of upwardly flaring form is defined within said tower, a plurality of bubble trays extending across said vapor path and arranged to form a plurality of fractionating sections, means for conveying product liquid from the bottom bubble trays of the fractionating sections to said rectifying sections, and means for independently varying the quantity of product liquid delivered to each of said rectifying sections.

7. In apparatus of the type described, a tower, a plurality of rectifying sections within said tower, said rectifying sections being of successively decreasing cross sectional area from the lowermost section to the top section whereby a vapor path of upwardly flaring form is defined within said tower, a plurality of bubble trays extending across said vapor path and arranged to form a plurality of fractionating sections, means including adjustable seals, for conveying product liquid from the bottom bubble trays of the fractionating sections to said rectifying sections, and means for adjusting the position of said adjustable seals to vary the quantity of product liquid delivered to said rectifying sections.

8. In oil treating apparatus of the class described, a tower of substantially uniform cross sectional area throughout its height, a plurality of rectifying sections within said tower, said rectifying sections being of successively decreasing area from the lowermost section to the top section whereby a vapor path of upwardly flaring form is defined within said tower, a plurality of bubble trays extending across said vapor path and arranged to form a plurality of fractionating sections, adjustable means for conveying product liquid from the bottom bubble trays of the fractionating sections to said rectifying sections and means for injecting steam into said rectifying sections.

9. In oil treating apparatus of the class described, a fractionating tower, a plurality of rectifying sections within said tower, said rectifying sections being of successively decreasing cross sectional area from the lowermost section to the top section whereby a vapor path of upwardly flaring form is defined within said tower, a plurality of bubble trays arranged to form superimposed fractionating sections and extending across said vapor path and means for conveying liquid from the bottom bubble tray of each fractionating section to the rectifying section next below.

10. Apparatus for fractionating oil and rectifying the separated fractions including a shell having a vapor inlet and a vapor outlet, a plurality of fractionating sections disposed in said shell in superimposed relation in which oil vapors are adapted to condense at progressively decreasing temperatures, a plurality of rectifying sections in said shell, said rectifying sections being adapted to receive heat from the adjacent fractionating sections and means for discharging condensate from one of said fractionating sections to a rectifying section therebelow whereby the material discharged into said rectifying section will be subjected to indirect heat exchange from the fractionating section next below, said rectifying sections being adapted to define a vapor path of enlarging cross sectional area extending from said inlet toward said outlet.

11. Apparatus for fractionating oil and rectifying the separated fractions including a shell having a vapor inlet and a vapor outlet, a plurality of fractionating sections in said shell each having a plurality of bubble trays comprising fractionating zones in which oil vapors condense at progressively decreasing temperatures, said fractionating sections being arranged to provide a vapor path of enlarging cross sectional area extending from said inlet toward said outlet, a plurality of rectifying sections within said shell, at least a portion of said rectifying sections extending in the direction of vapor flow throughout substantially an entire fractionating section whereby material withdrawn into said rectifying section will be subjected to indirect heat exchange with a plurality of zones of higher temperature, and means for discharging fluid from a fractionating section into the rectifying section next below.

12. In apparatus for fractional distillation, a tower having a plurality of rectifying sections disposed therein, means for providing a vapor path of upwardly enlarging cross sectional area in said tower, said means including a plurality of bubble trays extending across said vapor path and arranged to form a plurality of fractionating sections, and adjustable means for conveying liquid from the bottom bubble tray of a fractionating section to a rectifying section therebelow, said rectifying sections being adapted to extend in the direction of flow through the tower a distance sufficient so that material withdrawn thereinto will be passed in indirect heat exchange with a plurality of zones of higher temperature which exist on the bubble trays adjacent the rectifying section into which the material is withdrawn.

JAMES N. GARRISON.